April 18, 1967  W. BERTRAM  3,315,084
HOUSING FOR LIGHT METER USING PHOTORESISTANCE
Filed June 10, 1964  2 Sheets-Sheet 1

INVENTOR.
WILHELM BERTRAM
BY
ATTORNEYS

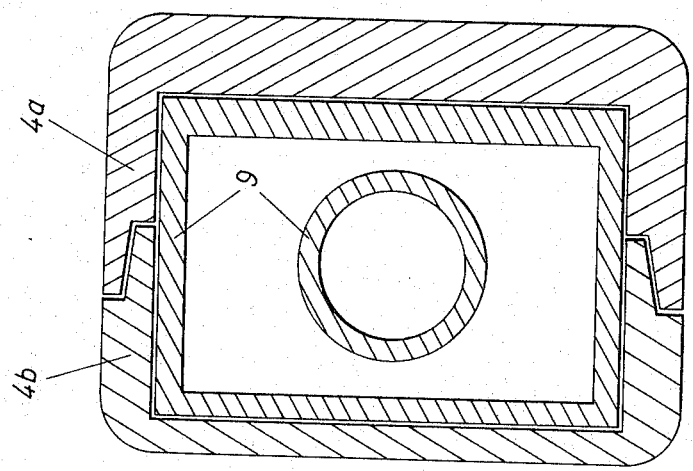
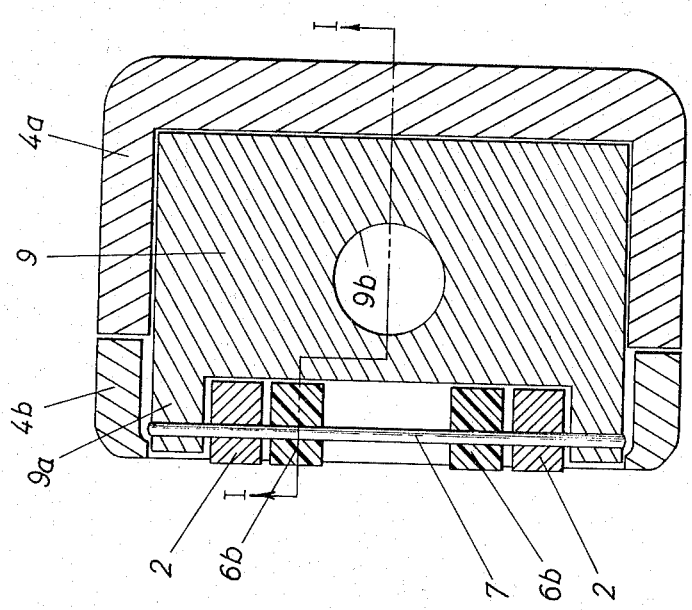

United States Patent Office 3,315,084
Patented Apr. 18, 1967

3,315,084
HOUSING FOR LIGHT METER USING PHOTORESISTANCE
Wilhelm Bertram, 125 Plannegger Strasse, Munich-Pasing, Germany
Filed June 10, 1964, Ser. No. 374,118
6 Claims. (Cl. 250—239)

This invention has reference to a light meter, including a light-sensitive element comprising a photo-resistance, which between light measurements can be covered by means of a light-proof cover device.

Photo-resistances as light-sensitive elements in light meters have the advantage as compared to photo-cells that they are sensitive to a greater range of brightness. However, photo-resistance have the property of showing after-effects for some time, if they are exposed to considerable light magnitudes for a certain length of time.

If a relatively long recovery time is not observed after a measurement of a large light intensity, measuring error may occur in subsequent measurements of low light magnitudes. It is therefore necessary to make sure that the photo-resistance is covered immediately after every measurement. In the previous light meters of the above-defined category, a light-proof slide is provided as cover. The use of a slide, perhaps constructed as a louver, has the disadvantage that special guide means must be attached to the light meter housings. These guide means make it difficult to attach a diffusor in addition to the slide, as would be desirable for the measuring of the general brightness of the environment. The use of a louver-like slide as a cover, therefore, usually excludes the simultaneous attachment of a diffusor. To be sure, there are slides which are opaque in one section and act as a diffusor in another section. However, their slideway is long and often causes error, because instead of a complete opening of the light passage it often happens that the diffusor is brought into register therewith. Another great disadvantage lies in the fact that the closing of the cover slide after the measuring is often forgotten. Externally speaking, the light meter looks hardly different when the slide is open as compared to when the slide is closed, so that the user does not become aware of the necessity for closing the slide. Thus, it may happen that the photo-resistance is illuminated over a period of some time so that the battery of the light meter is soon exhausted. To forestall this danger, a previous meter is equipped in its battery circuit with a switch which is closed only during measuring and otherwise interrupts the circuit. This switch constitutes an undesirable additional construction feature and impedes the handling.

It is the purpose of the present invention to remove these disadvantages in a light meter of the above-described category. The invention accomplishes this, first, by constructing the cover device as a cover lid which is pivotally mounted on the case of the meter, can be locked in its covering position and is arched toward the outside, and, second, by arranging inside the cover lid a second cover lid which is also pivotally mounted on said case, is arched toward the outside and consists of light diffusing material.

When a lid-like cover device is used, no guide means are necessary on the housing of the light meter. A cover lid arched toward the outside provides the possibility of attaching a diffusor in front of the photo-resistor in a manner which is simple from a construction standpoint. It is merely necessary to arrange a second lid, consisting of diffusor material, inside of the light-proof cover lid, as is proposed in the present invention. This diffusor lid, which is also arched toward the outside, is illuminated from all directions when the cover lid is pivoted back, which means that an exact measuring of the brightness of the environment can be carried out. The lid-like construction of the cover device has, in connection with the use of a photo-resistance, the special advantage that when the cover lid is open the contours of the light meter are changed in a manner which makes it hard to handle and prevents its entrance into a pocket of the user and laying it down in a normal position. This means that the user is automatically reminded of the necessity for closing the lid after taking measurements. It is practically impossible to expose the photo-resistance to strong illumination over a long period of time by mistake. This considerably reduces the danger of false measurements on the one hand, while on the other hand it is possible to eliminate the need for a special switch for the purpose of interrupting the circuit. When the cover plate is closed, the resistance value of the photo-resistance is so great that practically no current flows in the circuit. This naturally simplifies using the device.

Other objects and purposes of the present invention are to be seen in the following description of a preferred embodiment in connection with a drawing.

In the drawing:

FIGURE 2 is a sectional view taken on the line II—II of FIGURE 1.

FIGURE 3 is a reduced sectional view substantially as taken on the line III—III of FIGURE 1 and with the photo-sensitive element removed therefrom.

Figure 1:
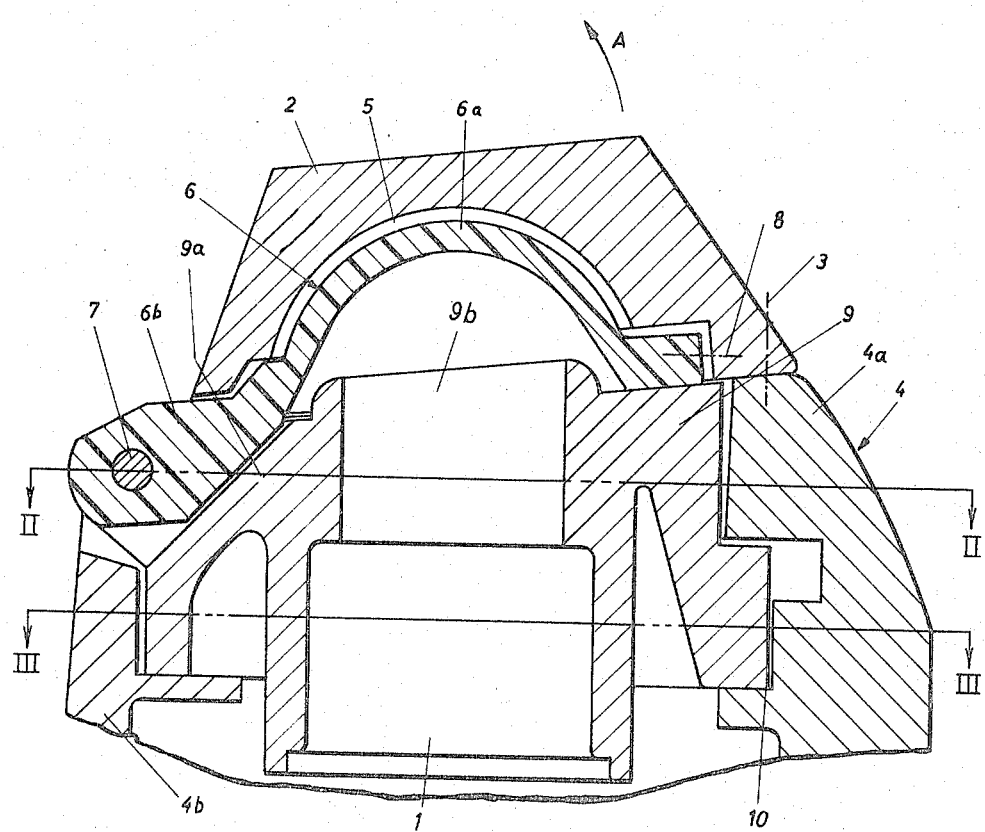
FIGURE 1 is a central cross-sectional view of a light meter embodying the invention substantially as taken on the line I—I of FIGURE 2.

The light meter shown is equipped with photo-resistance 1 acting as a light-sensitive element. In order to protect photo-resistance 1 against light entry between measurements, a cover device is provided which according to the invention is constructed as cover lid 2. This lid 2 consists of a material opaque to light and is arched toward the outside in a convex fashion. It is hinged or pivotally mounted in such a manner that it can be pivoted from the closed position shown in the drawing in the direction of arrow A into an open position where the light can hit photo-resistance 1. To allow this, lid 2 can be locked against housing 4 of the light meter by movable locking devices generally indicated at 3 which are not shown in detail. A spring arm locking device is especially suitable for this purpose.

The construction of cover device 2 as a lid arched toward the outside produces a stiff construction which for this reason protects photo-resistance 1 particularly well. There will also remain in the interior of cover lid 2 a hollow space 5, in which according to the invention a diffusor lid 6 is found. Diffusor lid 6 includes a cap or shell 6a of any convenient translucent material capable of diffusing light. Diffusor lid 6 is also pivotally mounted by means of an extension 6b. The extension 6b is opaque to prevent light leakage into the photo-resistance 1 when lid 2 is closed. Thus, the diffusor material can either be colored or otherwise made opaque in this area or else diffusor lid 6 can be constructed in two parts with the extension 6b of inherently opaque material. The shell 6a of diffusor lid 6 arches toward the outside in the shape of a hemisphere so that when cover lid 2 is pivoted into an open position, light strikes the diffusor cap from all sides. Cover lid 2 and diffusor lid 6 are advantageously located on the same link bolt 7 in the manner of a hinge. This makes the construction particularly simple and space-saving.

Diffusor lid 6 is connected with cover lid 2 by a plurality of releasable closing devices which are indicated at 8, but are not shown in detail. This means that normally, when cover lid 2 is pivoted into an open position, diffusor lid 6 is taken along. If measuring with a closed diffusor is desired, closing device 8 is opened and diffusor lid 6 remains in the light path.

In the preferred embodiment shown, an inset piece 9 is provided which is held in groove 10 of the light meter housing, which consists of two halves 4a and 4b. Inset piece 9 has a passage 9b therethrough which is coverable at its outer end by diffusor lid 6 and in which photo-resistance 1 is secured. Inset piece 9 also is equipped with a lobe 9a which serves for the attachment of link bolt 7 for the hinge bearings of lids 2 and 6. Inset piece 9 connects lids 2 and 6 together with the photo-resistance 1 into one constructional unit, thus simplifying the construction and assembling of the light meter considerably.

Cover lid 2 is so formed and placed that it can be pivoted by at least 180° from its closed position. This not only makes sure that the open cover lid 2 does not prevent the admission of light to the diffusor 6 in any way, but also insures that the completely opened cover lid 2 hinders the depositing or pocketing of the meter, thus reminding the user of the necessity for closing the lid after the measuring operation.

Because of the fact that the cover lid is arched towards the outside the possibility also exists (not indicated in the drawing) that additional lids can be arranged in the hollow space 5 in addition to the diffusor lid 6. Thus, one or several partly light-permeable lids can be provided additionally, which for measurement in different brightness ranges can be positioned in front of photo-resistance 1 as desired.

All features derived from the description and the drawing, including their constructive details can be inventive in any desired combinations.

What is claimed is:

1. In a light meter having a body with a photo-resistance element therein acting as a light sensitive element for controlling the actuation of the meter and having means forming a light receptive opening for conducting light to the light sensitive element, an opaque one piece cover adapted to prevent access of light to said opening and a diffusor lid having an externally bulged translucent portion adapted to receive light from a wider angle than the receiving angle of said opening, said meter being characterized by a first pivoted connection means between the cover and said body along one edge of said cover permitting the swinging of said cover between a closed position over said opening and an open position projecting from the side of said body, said cover having an interior recess adapted to receive said translucent portion when said cover and said lid are closed on said body, and a second pivoted connection means between said lid and said body along one edge of said lid permitting swinging movement of said lid between the closed position over said opening and an open position in which said lid lies outside the receiving angle of said opening.

2. The device defined in claim 1 wherein said first pivoted connection means permits swinging of said cover through approximately 180° between said closed position and said open position, wherein the translucent portion of said diffusor lid is of externally convex shape and wherein the inner side of said cover is adapted to receive said translucent portion.

3. A light meter as defined in claim 2 in which said pivoted connection means to said cover and said lid are on the same side of said body.

4. A light meter as defined in claim 3 in which said cover and said lid have their pivot connection means on a common pivot pin carried by said body.

5. A light meter as defined in claim 4 in which said light sensitive element and said pivot pin are mounted on a common insert receivable in said body, and in which said opening is formed in said insert.

6. A light meter as defined in claim 2 in which said cover has a portion coacting with said body to limit the open position of said cover to a location projecting laterally of said body with all portions of said cover at least behind the plane of light access to said convex translucent portion of said lid.

References Cited by the Examiner
UNITED STATES PATENTS

| 2,119,235 | 5/1938 | Kuppenbender | 88—23 |
| 2,178,197 | 10/1939 | Bing | 88—23 |
| 2,337,122 | 12/1943 | Norwood | 88—23 |
| 2,504,346 | 4/1950 | Norwood | 88—23 |
| 2,612,817 | 10/1952 | Willcox | 88—23 |

WALTER STOLWEIN, *Primary Examiner.*